US006490295B1

(12) United States Patent
Cooklev et al.

(10) Patent No.: US 6,490,295 B1
(45) Date of Patent: Dec. 3, 2002

(54) HIGH-SPEED MODEM OPERATING OVER TWO OR MORE TELEPHONE LINES

(75) Inventors: Todor Cooklev, Salt Lake City, UT (US); Kevin Smart, Bountiful, UT (US)

(73) Assignee: 3Com Corporation, Santa Clara, CA (US)

( * ) Notice: Subject to any disclaimer, the term of this patent is extended or adjusted under 35 U.S.C. 154(b) by 0 days.

(21) Appl. No.: 09/304,392

(22) Filed: May 4, 1999

(51) Int. Cl.[7] .............................. H04J 3/04; H04J 3/16; H04L 5/16
(52) U.S. Cl. ...................... 370/465; 370/536; 375/222
(58) Field of Search ...................... 375/242, 285, 375/365, 254, 222, 368, 266, 356, 221; 370/535–537, 538, 493–495, 271, 465; 379/345, 87, 93.01

(56) References Cited

U.S. PATENT DOCUMENTS

| 5,214,637 A |   | 5/1993  | Sridhar et al. |         |
|-------------|---|---------|----------------|---------|
| 5,515,398 A |   | 5/1996  | Walsh et al.   |         |
| 5,636,037 A |   | 6/1997  | Saitoh         |         |
| 5,682,404 A | * | 10/1997 | Miller         | 375/222 |
| 5,801,695 A |   | 9/1998  | Townshend      |         |
| 5,815,505 A |   | 9/1998  | Mills          |         |
| 5,859,872 A | * | 1/1999  | Townshend      | 375/242 |
| 6,023,493 A | * | 2/2000  | Olafsson       | 375/354 |
| 6,198,749 B1 | * | 3/2001 | Hui et al.     | 370/536 |
| 6,233,250 B1 | * | 5/2001 | Liu et al.     | 370/469 |
| 6,240,137 B1 | * | 5/2001 | Kato           | 375/240.26 |

* cited by examiner

Primary Examiner—Kwang Bin Yao
Assistant Examiner—Hanh Nguyen
(74) Attorney, Agent, or Firm—Workman, Nydegger & Seeley

(57) ABSTRACT

A communication system configured to transceive a signal along multiple communication media of the communication system thereby increasing the rate at which the signal is transceived. The communication system comprising a source configured to transceive a signal. A communication apparatus configured for decomposing the signal into a plurality of manipulated signals. The number of the plurality of manipulated signals being determined by the number of the multiple communication media in communication with the source and the maximum transceival rate of each communication media. In communication with the communication apparatus is a reconstructing apparatus that is configured for reconstructing the plurality of manipulated signals into the signal, the signal being capable of being transceived by a host.

39 Claims, 11 Drawing Sheets

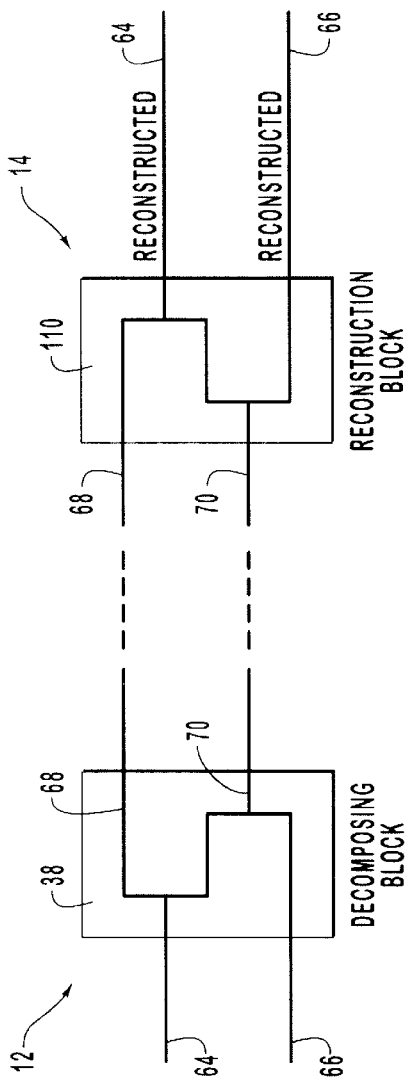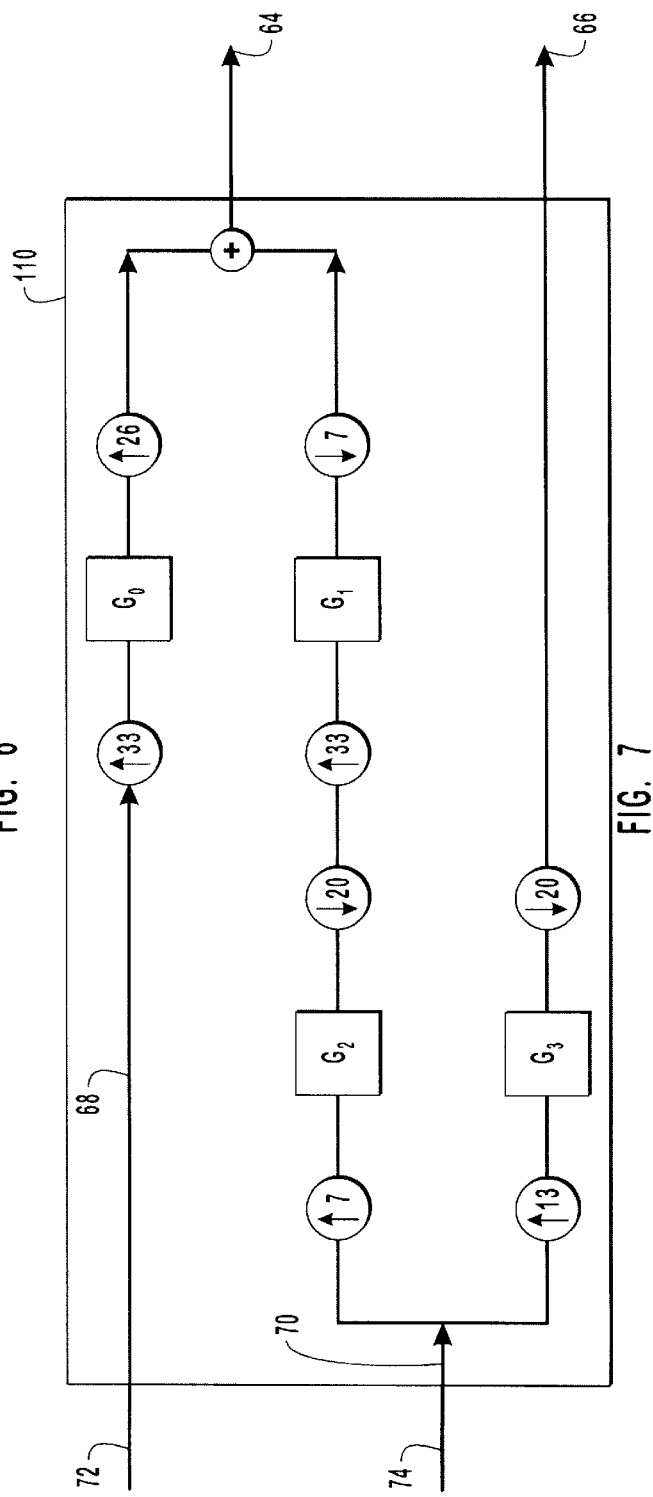

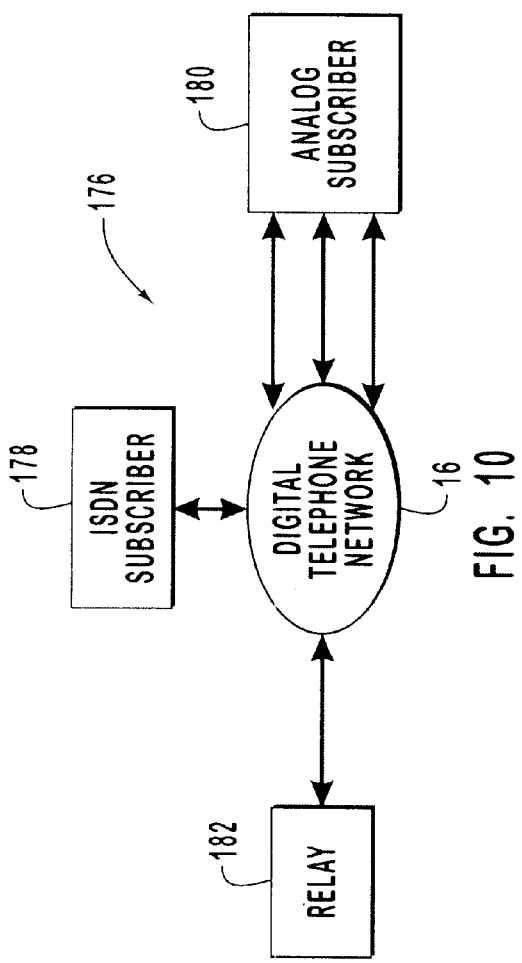
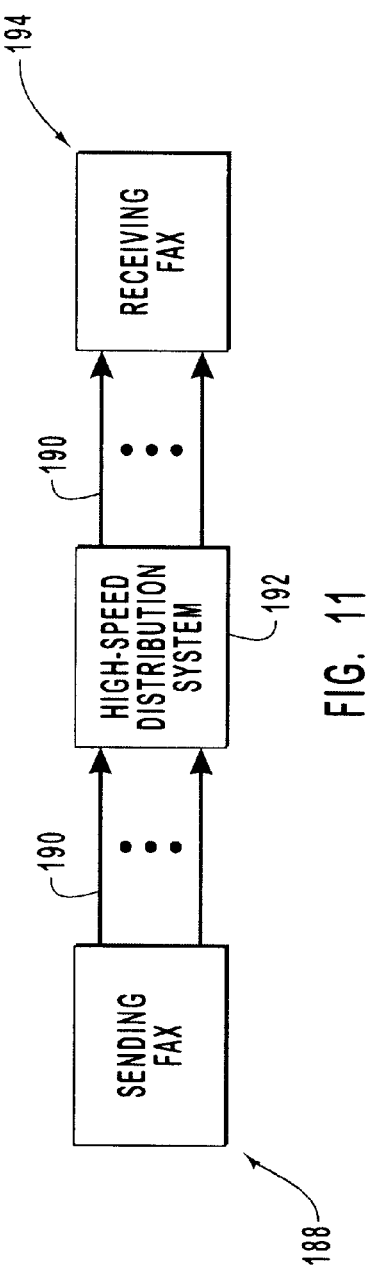
FIG. 10
FIG. 11

HIGH-SPEED MODEM OPERATING OVER TWO OR MORE TELEPHONE LINES

BACKGROUND OF THE INVENTION

1. The Field of the Invention

The present invention generally relates to communication devices used within a communication system or network, and, more particularly, to a device for transceiving signals over multiple telephone lines or similar transceiving lines.

2. Present State of the Art

Throughout the ages man has initiated and developed numerous methods to communicate information. Communication in one form or another is used continuously, whether it be face to face conversation involving both body and verbal communication or through pictures, music, or art. With the advances in technology, however, individuals wish to spend more time communicating to discuss business, entertainment, and other daily events, but wish communication, in all its forms, to be more easily accomplished.

The modern society in almost every respect is crucially dependent on its ability to communicate signals or data, whether in digital or analog form, from one point to another. With the advances in technology the Internet has become ubiquitous for business and electronic commerce, education, entertainment, etc. As such, individuals, companies and other entities demand faster and faster communication speeds to manufacture, distribute and sell their products and services. In many situations, the speed of signal transmission or receiving ("transceiving") directly impacts the quality of the services provided via the Internet, for example real-time video conferencing requires a minimum transceiving speed to be feasible.

The communication channels over which data is transceived is almost always the widespread public switched telephone network (PSTN). The core of the PSTN in the United States and other industrialized countries is completely digital, while the connection to the digital backbone is traditionally analog. A digital connection to the PSTN is possible through a service such as the Integrated Services Digital Network (ISDN). The ISDN provides 2 digital channels that are each capable of transceiving signals or data at a rate of 64,000 bits per second ("b/s") and a control channel that can transceive signals or data at 16,000 b/s.

To use the ISDN, a user's central office ("CO"), such as a local telephone company's switching office, must be upgraded to provide lines and other equipment capable of transceiving signals. Therefore, the user must replace the analog on-premises equipment with digital equivalents, while the individual lines at the CO must be modified to carry digital data such as fiber optic cable. The installation costs and monthly charges for connectivity through an ISDN are significant, such that most users do not have a digital connection to the PSTN. Furthermore, ISDN digital connections are infrequently offered in rural and sparsely populated areas since it is difficult for telephone companies to recoup their investment in equipment and installation. In light of this, most users continue to have an analog connection to their CO.

The analog portion of the PSTN was designed to carry voice as inexpensively as possible. In particular, most analog connections to a CO are bandlimited and carry signals with a bandwidth ranging from about 200 Hz to about 3200 Hz in the United States and from about 300 Hz to about 3400 Hz in some other countries. The band ranges were chosen decades ago, as the narrowest possible band which could contain specific important characteristics of the human voice. Any signals outside these ranges are typically sharply attenuated.

To transceive data over an analog connection to the CO requires a modem. A modem performs two tasks: modulation, which converts the digital signal into an analog signal in the upstream direction, and demodulation, which converts the analog signal into a digital signal in the downstream direction. Most modems today convert a digital data stream into an analog signal within the bandwidths referenced in regard to the PSTN.

In recent years substantial progress has been achieved in modem design. While earlier modems could operate only at rates of 2400 b/s, modem speeds have increased up to 33,600 b/s. See International Telecommunications Union, Telecommunication Standardization Sector (ITU-T) Recommendation V.34, Geneva, Switzerland (1994) which is hereby incorporated as a reference.

Unfortunately rates of up to 33,600 b/s are insufficient for many of the newer applications envisioned with the advent of the Internet, such as video conferencing. While text transmission is fast, facsimile and especially still image transmission is slow. Furthermore, even with current sophisticated audio compression algorithms only low-quality video and audio is possible.

There are fundamental limitations that reduce the quality of data transmission in addition to lowering the maximum achievable data rate over the PSTN. The capacity of a communication channel on the PSTN, as discussed in C. Shannon, "A Mathematical Theory of Communication," Bell System Technical Journal volume 27, pp. 379–423 and pp. 623–656, 1948, which is incorporated herein by reference, is given by $$C = W\left(1 + \log\frac{S}{N}\right) \quad (1)$$

where C is the maximum achievable data rate in b/s, W is the bandwidth of the channel in Hertz, and S/N is the signal to noise ratio. For most of the PSTN of the United States S/N at present is below 2000 (approximately 30 dB). If we substitute these numbers into the above equation we can easily find out that $C \approx 3000 \times 12 = 36,000$ b/s. Regardless of the sophistication of current signal processing algorithms or the speed of current processors, the maximum achievable data rate remains the same for a single PSTN line. It is clear that current modem standards have achieved a rate which is very close to the maximum possible. Thus the speed of modems is limited not by available technology, but by the limited bandwidth of the telephone system.

The bandwidth limitation becomes more acute when combined with the changing usage of the PSTN. In the past most of the traffic over the PSTN was voice, with very little percentage of the total traffic being data. At the beginning of the next century, however, the ratio of voice to data traffic is expected to become reversed; with more data traffic than voice traffic.

A significant portion of the increase data traffic is caused by the availability of the Internet access. Most users today connect to the Internet through their Internet Service Provider ("ISP"). ISPs usually have a high-bandwidth direct digital connection to the PSTN. Normally high-rate of communication is necessary in one direction only, from the ISP to the user (the downstream direction). This arrangement allows speeds of up to 56,000 b/s in the downstream direction. Currently modems capable of receiving data at speeds up to 56,000 b/s are available from several modem vendors, such as the 3Com Corporation, Santa Clara, Calif.

Many 56,000 b/s modems are capable of transceiving signals at various rates. Furthermore, the ITU-T V.90 standard for modems that can operate at rates up to 56,000 b/s actually envisions several possible modem data rates that vary based on the telephone line conditions, such as the effects of signal-to-noise ratio. Thus, unlike previous modem standards ITU-TV.90 does not specify a single data rate in the downstream direction. The allowed rates in the downstream direction range from about 28,000 to 56,000 in 1,333 b/s increments.

In normal communication sessions, two modems that are in communication will evaluate the telephone line conditions according to a line probing technique. Such line probing techniques are discussed for example in U.S. Pat. No. 5,515,398 entitled "Modem line probing signal techniques," issued to Walsh et al. which is assigned to the assignee of the present invention. The superior the line conditions, the higher the data rate at which the two modems will choose to operate.

Line characteristics of the PSTN lines can change with time, however, and may be varied through influence of electric and magnetic fields that are in close proximity to the PSTN lines. For example, power lines can induce a 60 Hz hum onto an analog telephone line. Furthermore, unwanted signals from adjacent telephone lines can induce unwanted voltages, called crosswalk. The influence of hum and crosswalk decrease the signal-to-noise ratio (S/N) and reduce the maximum data rate that can be achieved over the telephone line. Each time the line characteristics deteriorate the modems in communication negotiate to select a lower rate at which to communicate reliably. If the line characteristics improve the modems will select a higher rate. Therefore, over a single telephone line it is possible to connect sometimes at 49,333 b/s, while at another time is only possible to achieve 45,333 b/s.

Unlike end-to-end digital connections used by an ISP, the analog telephone lines making up the PSTN are widely available and relatively much more expensive. An increasing number of businesses and people have two and more telephone lines to allow them to perform multiple tasks concurrently. Indeed many user add a second telephone line just for occasional use, for example, for facsimile services. The precious bandwidth that is offered by the second telephone line is wasted most of time. The productivity of many users would be increased if they could use the second telephone line to achieve higher-speed access to an ISP, other modems, or the like.

Unfortunately, there are numerous problems with forming a modem that is capable of communicating signals over two or more telephone lines. A significant problem is the variability of telephone line conditions and characteristics.

When two modems operate over two or more telephone lines, if the line conditions on all lines are identical, then clearly the aggregate data rate is the sum of the data rates that are achieved over the individual phone lines.

However, the line conditions, will not always be identical. As a matter of fact, they are very likely to be different. For example, it is clear that the amount of noise induced onto two telephone lines will be different. This noise typically comes from neighboring telephone lines, power lines, etc, as stated above. According to the Shannon's limit the maximum data rates that can be achieved over the two lines will be different, as the maximum achievable data rate over each line will directly depend on the signal-to-noise ratio (SIN) over that line. If the rates are different, however, it is not obvious how can we achieve an aggregate data stream equal to the sum of the data rates achieved over the individual lines. One obvious possibility is to select the lowest data rate that the telephone lines can work at and use this rate on all telephone lines. For example, if it is found that one of the lines supports 49,333 b/s and the other supports 45,333 b/s, assuming that we have two telephone lines, we might select to operate at 45,333 b/s over the two telephone lines, achieving an aggregate data stream of 90,666 b/s. Clearly this is not the optimum solution. It is very desirable to achieve a data rate of 94,666 b/s, which is the sum of the two data rates in this example.

Thus, the present state of the art dictates that if the two or more data rates achievable over the different telephone lines are not the same negotiation is performed, followed by a fallback on all lines onto a data rate equal to the rate achieved by the slowest line. It is clear that the aggregate data rate would be only the data rate achieved on the slowest line times the number of channels, but not the sum of the maximum data rates on every line. Furthermore the process of negotiating different rates on the lines is slow. It is also very inefficient to require the modems to negotiate new communication rates each time the minimum data rate changes.

These disadvantages can have a significant and negative effect on a modem's performance and might make it less commercially viable for sale.

SUMMARY AND OBJECTS OF THE INVENTION

It is an object of the present invention to provide a communication device that is capable of transceiving signals along two or more communication lines.

It is another object of the present invention to provide a communication device that is capable of transceiving data at a rate corresponding to the maximum aggregate communication rate of two or more communication lines.

Another object of the present invention is to provide a communication device that achieves an aggregate data rate that is the sum of the maximum data rates achievable on the individual telephone lines.

It is another object of the present invention to provide a communication device that is cheap and inexpensive.

Still yet another object of the present invention is to provide a communication device that is capable of secure communication over an unsecured communication network.

Yet another object of the present invention is to provide a communication device that is capable of multiplexing signals along multiple telephone lines at a communication rate substantially similar to the aggregate communication rate of the multiple telephone lines.

It is another object of the present invention to provide a method of manipulating signals to be communicated along multiple telephone lines into a form that allow maximization of the communication rate of the telephone lines.

It is another object of the present invention to provide a method and system that achieves signal communication rates that are substantially equal to the aggregate of the telephone lines used.

Still yet another object of the present invention is to provide a modem device that is capable of secure communication over an unsecured communication channel.

Additional objects and advantages of the invention will be set forth in the description which follows, and in part will be obvious from the description, or may be learned by the practice of the invention. The objects and advantages of the invention may be realized and obtained by means of the instruments and combinations particularly pointed out in the appended claims. To achieve the foregoing objects, and in accordance with the invention as embodied and broadly described herein, a communication system configured to transceive a signal along multiple communication media of the communication system to thereby increase the rate at which the signal is transceived is disclosed. The communication system comprising a source configured to transceive a signal. A communication apparatus configured for decomposing the signal into a plurality of manipulated signals. The number of the plurality of manipulated signals being determined by the number of the multiple communication media in communication with the source and the maximum transceival rate of each communication media. In communication with the communication apparatus is a reconstructing apparatus that is configured for reconstructing the plurality of manipulated signals into the signal, the signal being capable of being transceived by a host.

In general, the present invention allows a users to reap maximum benefits of a "bandwidth-on-demand" policy where users can access any type of digital signal (high-quality audio, video, etc.) at speeds which are maximum for their available telephone lines. By allowing increase signal transceival rates, the present invention makes several new applications possible, such as for example videophone, teleconferencing, high-quality video and audio, etc.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 6 is a block diagram representing the operation of a decomposing block and a reconstructing block of the communication system in FIG. 1.

FIG. 7 is a low level block diagram representing a decoder of the communication system in FIG. 1.

FIG. 10 is a block diagram representing a digital telephony relay in accordance with the present invention.

FIG. 11 is a block diagram representing a high speed facsimile system in accordance with the present invention.

DETAILED DESCRIPTION OF THE PREFERRED EMBODIMENTS

The present invention is directed to systems and devices that are capable of manipulating multiple signals such that they may be transceived along multiple communication channels at a rate substantially equal to the sum of the maximum communication rate achievable on each individual communication channel. More specifically, the present invention is capable of decomposing multiple input signals to be transceived within a telephone network at a data communication rate equal to the sum of the maximum communication rate of each individual telephone line connected to the communication device.

Figure 1:
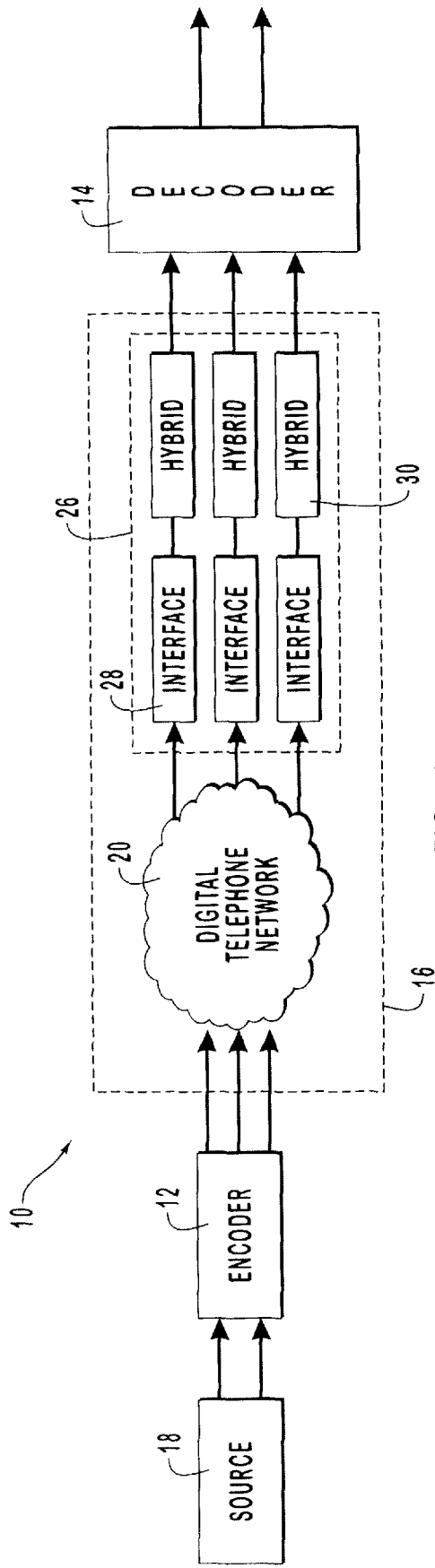
FIG. 1 is a block diagram representing one embodiment of a communication system of the present invention.

Discussion herein will be made in relation to an asymmetric communication system 10 when the beneficial effects of the principals of the present invention are best shown. It can be appreciated that the beneficial effects may also be seen as an asymmetric communication system. Referring now to FIG. 1, a communication system 10 of the present invention is depicted. Communication system 10, in this particular configuration, utilizes an encoder 12 and a decoder 14 in communication by way of a telephone network 16. A plurality of data streams from a source (not shown) are applied to encoder 12. This particular configuration source 18 is an internet service provider (ISP), however various other sources are applicable. Encoder 12 is formed to convert the digital data streams from ISP 18 into a number of data streams that correspond to the number of communication channels or telephone lines which are available to encoder 12. Furthermore, encoder 12 manipulates the digital signal into a format suitable for transceival through telephone network 16. The connection between encoder 12 and the telephone network 16 is digital thereby allowing a fast communication rate. Analog connectors may be used when communication system 10 is asymmetric.

The manipulated digital signal is output to telephone network 16 and more specifically to the digital backbone 20 of the telephone network 16. Through a direct digital-to-digital connection the manipulated digital data is incident to appear undistorted at a client's central office ("CCO") 26. The CCO 26 includes a plurality of line interfaces 28 and hybrid circuitry 30 that converts the digital data stream from digital backbone 20 to analog signals. More specifically, line interfaces 28 connects the input digital signal into an analog signal which hybrid circuitry 30 connects the two wire bi-directional analog signal to a pair of one way signals, i.e., 4 wire to 2 wire connectors.

The analog digital output for CCO 26 are capable of being transceived along the analog lines the CCO 26 to a decoder 14. Decoder 14 uses the transceived analog signals to compensate for any distortion introduced by the conversion from digital to analog by line interfaces 28 and hybrid circuitry 30 while constructing a plurality of data streams that are sent to a user's host (not shown). In general, telephone network 16 comprises the digital backbone, the CCO 26, and the analog connection to the user and may be considered the PSTN, the components thereof are well hence known to one skilled in the art and need not be discussed herein. It can be appreciated that the telephone network 16 may incorporate various other forms as known by one skilled in the art such as fiber optics, copper wire, PSTN, or the like.

Figure 2:
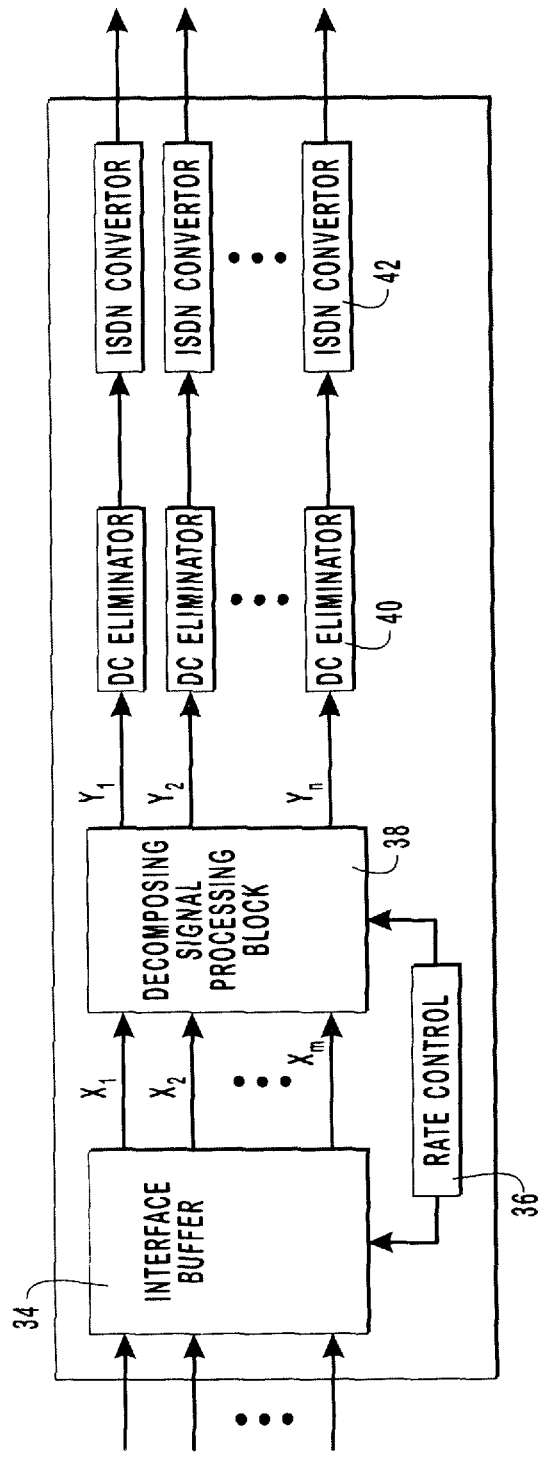
FIG. 2 is a block diagram representing an encoder of the communication system in FIG. 1.

Referring now to FIG. 2, a functional block diagram of one possible realization of encoder 12 according to the present invention is depicted. Encoder 12 comprises as an interface buffer, a decomposing block 38, a DC eliminator 40 and a ISDN convertor 42 each of which will be discussed in detail hereinafter. The plurality of data streams from different sources are input to an interface buffer 34. Interface buffer 34 receives information from a rate control block and detaines the characteristics of the channels until the data is to be transceived along. Interface buffer 34 converts the individual data bit streams into sequences of eight-bit words in preparation for transceiving through the communication channels. The eight-bit words are sampled at any appropriate time depending on the raw data rate and the channel or telephone line characteristics of the telephone network 16. Furthermore, interface buffer 34 implements functions such as flow control (not explicitly shown) to maintain a smooth aggregate data rate as transceived along the communication channels.

Interface buffer 34 is necessary, because the aggregate data rate of transmission varies with time and can change at any moment. Thus, it is necessary to maintain a pool of data that may be drawn upon to create an optimized data stream output along the communication channels.

In communication with interface buffer 34 is a decomposing signal processing block or decomposing block 38. The purpose of decomposing block 38 is to transform the received plurality of data streams into a second plurality of data streams equal to the number of communication channels available to encoder 12. The transceiving rate of each data stream leaving decomposing block 38 is the maximum rate for each individual communication channel and the aggregate of all available communication channels cooperating with encoder 12. Since the characteristics of the individual communication channels vary with time, the characteristics of decomposing block 38 vary with time under the control of rate control block 36.

Shown in FIG. 2, decomposing block 38 has M input signals and N output signals. The total number of samples is preserved during the sampling operation such that the total sampling rate of all input signals M is equal to the sampling rate of all output signals N.

There are various configurations to provide the functionality of decomposing block 38. In one configuration, a multirate digital signal processor ("multirate DSP") changes the data rates of the one or more data streams that are applied to decomposing block 38. The theory of multirate DSP is well-known and is described for example in the book *Multirate Digital Signal Processing*, Prentice Hall, Englewood Cliffs, N.J., 1983, by R. E. Crochiere and L. R. Rabiner, and is considered in J. Kovacevic and M. Vetterli, "Perfect Reconstruction Filter Banks with Rational Sampling Rate Changes," Proc. IEEE ICASSP, 1991, Toronto, ON, Canada, pp. 1788–1795, which are incorporated there by these references. The functionality of decomposing block 38, will be described in greater detail hereafter.

The data streams from decomposing block 38 are transceived to a DC eliminator 40 and an ISDN conversion 42 in preparation for transceival to the telephone network 16. The functionality of DC eliminator 40 and ISDN conversion 42 is known to one skilled in the art. One example of the operation and functionality of DC eliminator 40 and ISDN conversion block 42 is described in U.S. Pat. No. 5,801,695 entitled "High speed communications system for analog subscriber connections" issued to Townshend, which is herein incorporated by this reference.

Referring again to FIG. 3A, a configuration of decomposing block 38 is depicted. If the data rates on all individual connections to encoder 12 are equal, then it would be a relatively simple matter to split the aggregate data stream into individual data streams. For example, the samples with an even index can be assigned to one of the data streams and the samples with an odd index can be assigned to the other stream. A more sophisticated scheme is necessary when the data rates are not the same as in many situations. Furthermore, the data rates vary with time, so decomposing block 38 must also vary with time, tracking the characteristics of the communication channel, to ensure that the aggregate data rate is optimal at all times.

Figure 3A:
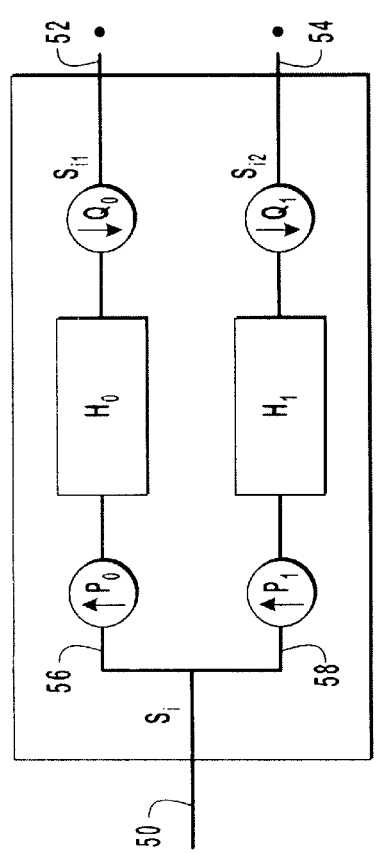
FIG. 3 is a block diagram representing a decomposing block and a reconstructing block of the communication system in FIG. 1.

Referring now to FIG. 3A, in the simplest case, decomposing block 38 receives one input signal 50 and outputs two signals 52 and 54 along a first channel 56 and a second channel 58, respectively. Therefore, in the preferred implementation of the present invention an input data stream $S_i$ is transceived by encoder 12 which is to be sampled at the highest rate. When the required sample rate is higher than the maximum communication rate of any of the communication channels, $S_i$ is decomposed into $S_{i1}$, and $S_{i2}$ such that the rate of $S_{i1}$, is equal to the maximum rate of one of output channels 56 and 58, say channel $Y_1$. The signal $S_{i1}$ becomes $Y_1$ and is transceived within the telephone network 16. If the communication rate of $S_{i2}$ exceeds the maximum rate of any channel, besides the channel already used by $Y_1$, then the same procedure is repeated with respect to $S_{i2}$, i.e. $S_{i2}$ is split into $S_{i2.1}$, and $S_{i2.2}$. If the rate of $S_{i2}$ is less than the maximum rate of any channel, say $Y_m$, then $S_{i2}$ is transceived along $S_2$ to the telephone network 16. In many situations the maximum rate of $Y_m$ is greater than $S_{i2}$ and therefore another input signal $S_j$ (not shown) or a part thereof may be transceived along $Y_m$. The configuration will be discussed in detail hereinafter.

Therefore, the maximum rate over first channel 56 is $S_{i1}$ and the maximum rate over second channel 58 is $S_{i2}$. Then the downsampling and upsampling ratios must be chosen so that:

$$\frac{p_0}{q_0} = \frac{S_{i1}}{S_i} \text{ and} \quad (2)$$

$$\frac{p_1}{q_1} = \frac{S_{i2}}{S_i} \quad (3)$$

hold, subject to the constraint $$\frac{p_0}{q_0} + \frac{p_1}{q_1} = 1 \quad (4)$$

where, $p_0$, $p_1$, $q_0$, and $q_1$ are constants derived during and after the negotiation process between ISP 18 and the user or the users modem (not shown). Therefore the establishment of a connection encoder 12 and decoder 14 negotiate the data communication rates for the two telephone lines. These communication rates in turn uniquely determine the parameters $p_0$, $p_1$ and $q_0 = q_1 = q$.

This arrangement will guarantee that:

$$S_i = S_{i1} + S_{i2} \tag{5}$$

at all times. In other words the total communication rate is equal to the sum of the two rates, as long as (2), (3), (4) are fulfilled. Typically the downsampling and upsampling $p_0$, $p_1$, $q_0$, and $q_1$ constants are not uniquely determined by these equations but the smallest values for which the equations hold will be chosen.

Figure 3B:
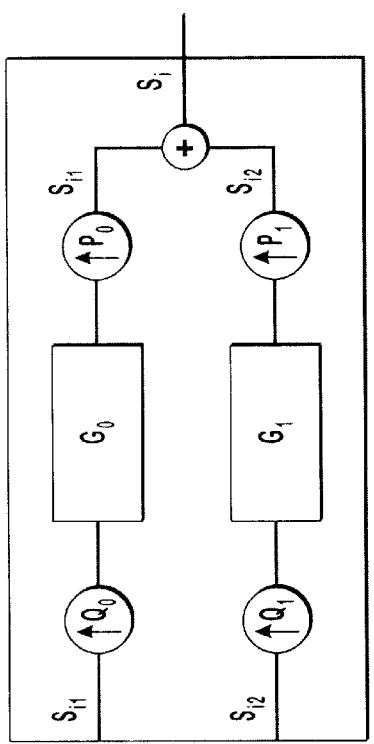

The implementation of all components of FIG. 3 is well-known to those of ordinary skill in the art. The design of the filters $H_0$ and $H_1$ for decomposing block 38 is discussed in the above-mentioned article by Kovacevic and Vettedi. The design of filters $H_0$ and $H_1$ is a problem with infinitely many solutions and the choice of the particular solution depends on the objectives of encoder 12. It is necessary for encoder 12 and decoder 14 to know the values of the filter coefficients to assure perfect reconstruction of the signal by decoder 14 as will be discussed in detail hereinafter. The value of $H_0$, $H_1$ can be calculated thus:

$$H_0(z) = \sum_{i=0}^{p_0-1} z^{-iq} z^{p0\ int[qi/p0]} H_0^{qi(mod p0)}(z^{p0}) \text{ and} \tag{6}$$

$$H_1(z) = \sum_{i=0}^{p_1-1} z^{-iq} z^{p1\ int[qi/p1]} H_1^{qi(mod p1)}(z^{p1}) \tag{7}$$

where int[.] means choosing the integer part of [.]. In the preferred embodiment, the filters are chosen such that the coefficients of their polyphase components are equal to the constant 1.

In this particular embodiment of the present invention, the complicated real-time design procedures are not necessary and encoder 12 and decoder 14 need not mutually agree upon the particular coefficients. In view of the teaching contained herein other arrangements are also possible where, for example, encoder 12 (this is a digital modem capable of a communication rate of approximately 56,000 b/s) has more resources and can calculate the filter coefficients and communicate them to decoder 14.

Figure 4:
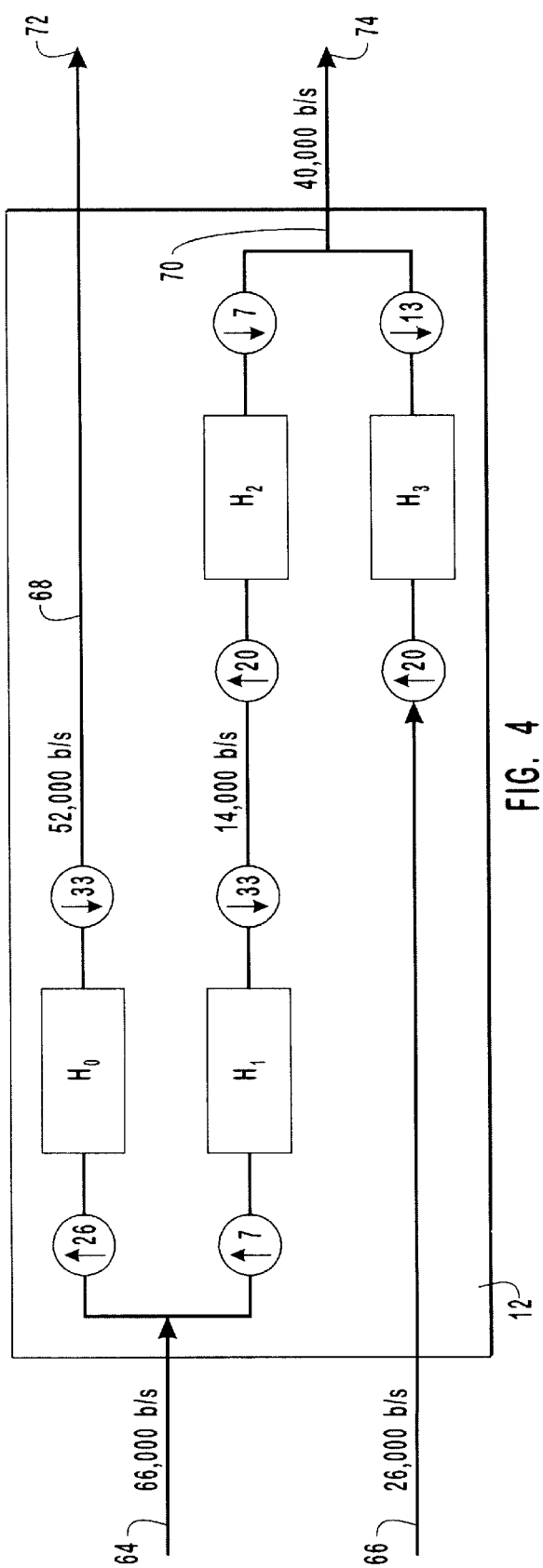
FIG. 4 is a low level block diagram representing a decomposing block of the communication system in FIG. 1.

According to another aspect of the present invention, shown in FIG. 4, a more complex scenario is possible utilizing the principals of the present invention. Encoder 12 has several input data streams to be multiplexed in an optimal fashion onto a different number of output data streams equal to the number of communication channels. Suppose there are two input signals, the first input signal 50 at rate 64,000 b/s and the second input signal 50 at a rate 26,000 b/s. The first input signal cannot be transmitted over a single telephone line since the maximum data rate of the particular line is 52,000 b/s. Suppose the transmit and receive modems (not shown) determine that the maximum rate they can reliably communicate over the first telephone 72 line is 52,000 b/s. Using the above described decomposition technique, first input signal 50 on data stream is decomposed into two streams 68 and 70, the first stream 68 at 52,000 b/s and the second stream 70 at 14,000 b/s. The second stream 70 at 14,000 b/s can be combined with the second input signal at 26,000 b/s to form a 40,000 b/s data stream to be sent over second telephone line 74. If second telephone line 74 has a maximum communication rate of greater than 40,000 b/s, additional data stream may be transceived along second telephone line.

There are various other methods and components which are capable of performing the functionality of encoder 12 and its functional blocks. For example, the functional components of encoder 12 can be implemented as programs or subroutines for a digital signal processor ("DSP"), using well-known digital signal processing techniques.

In general, encoder 12 is one example of means for decomposing the first signal into a plurality of manipulated signals, the number of the plurality of manipulated signals being determined by the plurality of communication channels connected to the means and the maximum transceival rate of each communication channel. In view of the teaching contained herein, one skilled in the art can identify various other means that are capable of performing the same function.

Figure 5:
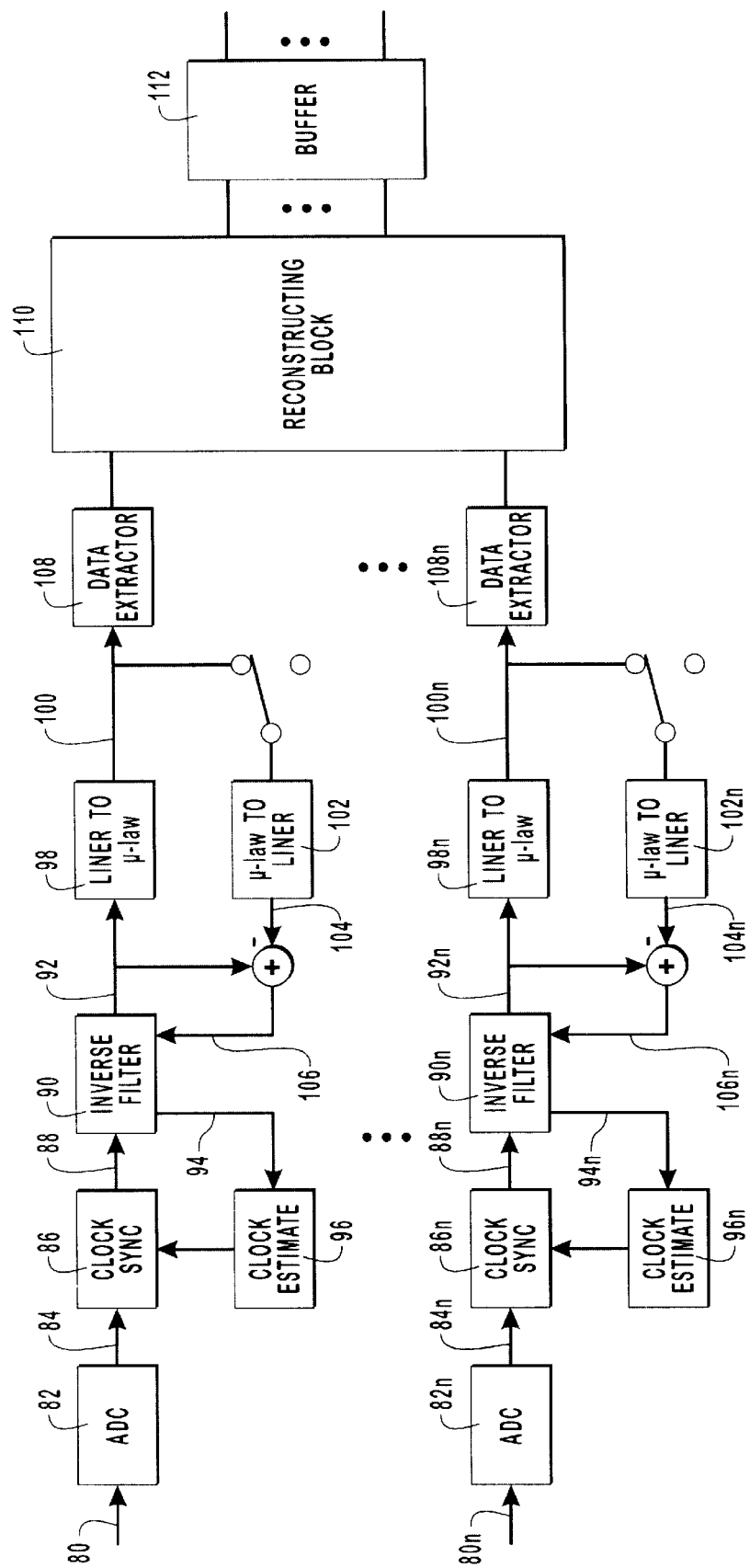
FIG. 5 is a block diagram representing a decoder of the communication system in FIG. 1.

Referring now to FIG. 5 a schematic representation of high-speed decoder 14 of the present invention. Decoder 14 is capable of operating over several telephone lines at speeds of xx56,000 b/s. The discussion related to decoder 14 will be with respect to a single group of components for a single line, however, n components are possible. The incoming analog signals 80, to 8 on from telephone network 16 is fed to an analog-to-digital converter 82 and converted to a digital signal 84. The digital signal 84 is processed by a clock synchronizer 86 which interpolates and resamples digital signal 84 to produce a synchronized digital signal 84. One configuration of the operation of a clock synchronizer 86 is described, for example, in U.S. Pat. No. 5,801,695. The clock synchronizer 86 is necessary to provide timing and synchronization with the signals transceived by encoder 12.

A variety of timing and synchronization schemes are known to those of ordinary skill in the art. In one method, for example, oscillators locked to the sampling rates of the sent pockets may be sent over the link. The received oscillators' signals may be used to derive (via phase locked loop techniques for example) the receivers' clock signals for sampling the plurality of signals coming from the plurality of communication channels. One method for removing an interfering signals (namely the received oscillator signal) from the accompanying system information signal is to form a feedback loop that subtracts out an amount of the known frequency until the resulting difference no longer contains correlation to the oscillator signal. Various other timing and synchronization schemes are known to one skilled in the art in view of the teaching contained herein.

The synchronized digital signal 84 is filtered by an inverse filter 90, which produce a compensated signal 92. The inverse filter 90 outputs a timing error estimate 94, which is fed to the clock estimation circuit 96. The compensated signal 92 is converted to the nearest eight-bit $\mu$-law word using a linear-to-$\mu$-law converter 98 to produce the estimated code stream 100. An error signal 106 is formed by subtracting from the output of inverse filter 90, a signal 104, which is a result of $\mu$-law-to-linear convertor 102 of the converted compensated signal 92. This error signal is supplied so that the inverse filter 90 can be adaptively updated. The estimated code stream 100 is then passed through a data extractor 108, which inverts the transformations performed by encoder 12.

Two or more signals come out of data extractors 108 and correspond to each individual connection with the telephone network 16. The signals are fed to a reconstructing block 110 which inverts the operation performed by decomposing block 38 in encoder 12. The reconstructing block 110 reconstructs exactly the input signals that were fed to decomposing block 38 in encoder 12 and output data stream to a buffer 112 similar to interface buffer 34.

Using multiple DSP theory, well-known to those of ordinary skill in the art, it can proven that the procedures performed by encoder 12 and decoder 14 are exact inverses of each other, i.e. that we can perfectly recover the aggregate data stream. Therefore, FIG. 6 depicts the comparison between encoder 12 and decoder 14 in general form, while FIGS. 3 and 7 depict reconstruction block 10 of decoder 14 to perform the necessary reconstruction of the signals in the above example.

In general, decoder 14 is one example of means for reconstructing the plurality of manipulated signals to form a second signal, the second signal having substantially the same form as the first signal. In view of the teaching contained herein, one skilled in the art can identify various other means that are capable of performing the same function.

Figure 8:
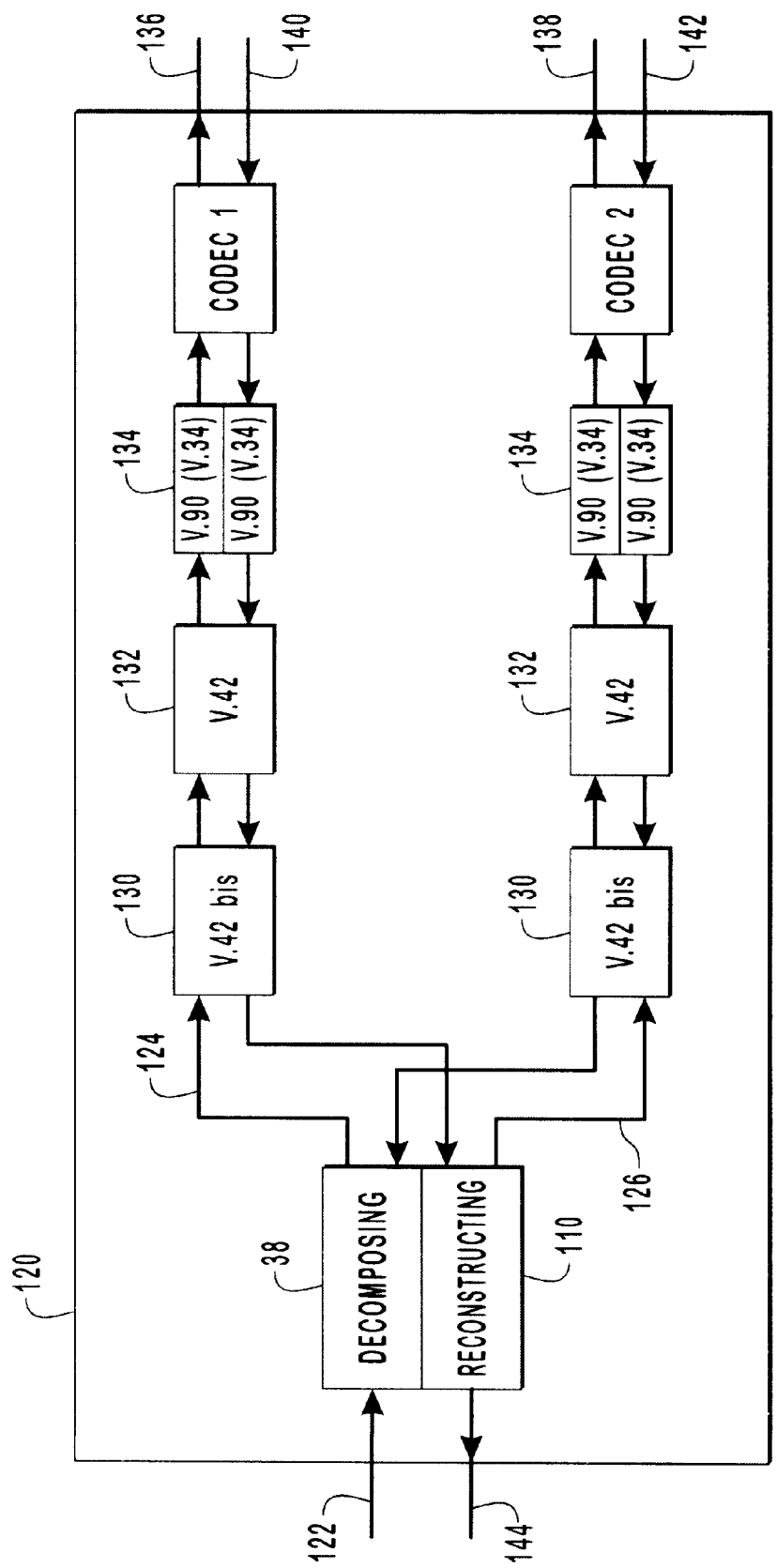
FIG. 8 is a block diagram representing a high speed two line modem utilizing the principal of the present invention.

Referring now to FIG. 8, a functional block diagram depicting a schematic representation of a two telephone line modem capable of operating in a full duplex mode and suitable for embodying the various aspects of the present invention. It is understood without having to be shown or described that the present exemplary modem includes conventional interchange modem circuits. In this particular embodiment, the modem circuitry complies with the functionality and operational requirements of the V.42 recommendation of the CCITT (now ITU-T) and all such interchange circuits are adequately terminated in the corresponding data terminal equipment (DTE). In accordance with appropriate recommendations for electrical characteristics. The term DTE is used generally to denote all sources and destinations of data.

As shown in FIG. 8, a modem 120 is configured with a decomposing block 38 and a reconstructing block 110. In transmission mode decomposing block 38 splits an input signal 122 into two and negotiates with the receiving modem (not shown) to determine the communication rate. Modem 120 is capable of performing the recessing modulation, echo cancellation, equalization compression, and data pumping as depicted by blocks 130, 132, and 134. Once negotiation is complete a first signal 124 is output towards coder/decoder CODEC in preparation for sending the signal, while the second portion, a second signal 126, of input signal 122 is output to the CODEC 2. CODEC 1 and CODEC 2 output signals 136 and 138 to the other commonly known components of modem 120 (not shown) to be transmitted along telephone network 16.

In receive mode, two signals 140 and 142 are received by modem 120 while a similar negotiation process occurs. The signals are input to CODEC 1 and CODEC 2, manipulated, and output to decoder 14. Decoder 14 reconstructs the signals and forms the requisite output signal that is received by the user (not shown).

Figure 9:
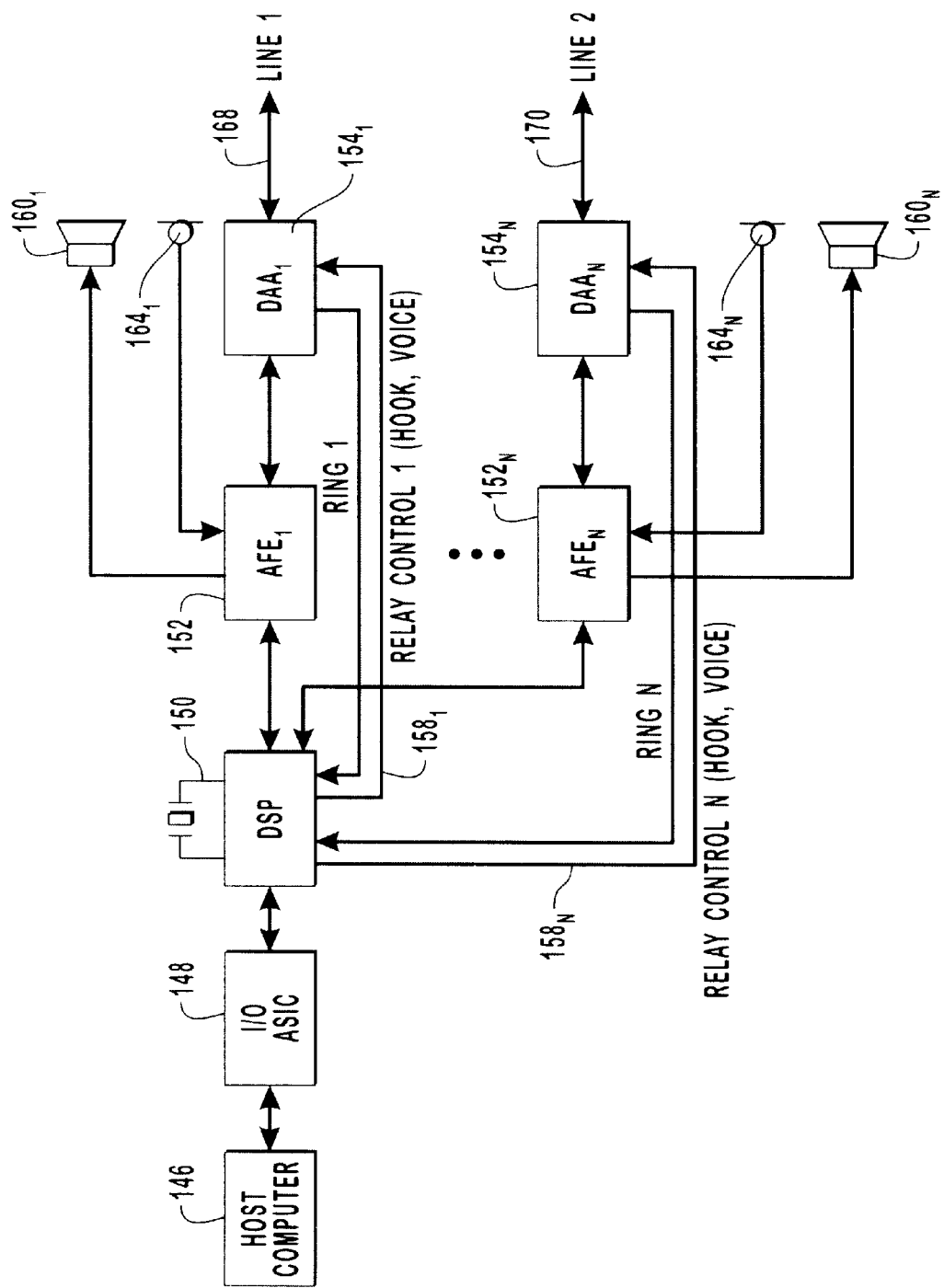
FIG. 9 is a low level block diagram representing the components necessary to perform the operation of the high speed two line modem of FIG. 8.

There are three principal implementations of the high-speed modem depicted in FIG. 8. FIG. 9 depicts the low and depicted at the circuitry required to is perform the three implementations. The first approach is to run two data pumps on a single processor. The host computer 146 communicates with the digital signal processor (DSP) 150 via the I/O application-specific integrated circuit (ASIC) 148. In a typical implementation ASIC 148 will be proprietary, while DSP 150 is preferably a TMS320C549, manufactured by Texas Instruments, Inc., of Dallas, Tex. The DSP 150 is coupled to the telephone lines 168 and 170 via analog front-end devices $152_1$ to $152_n$ ($AFE_1$ to $AFE_n$) and digital access arrangement ($DAA_1$ to $DAA_n$) $154_1$ to $154_n$. $AFEE_1$ to $AFE_n$ are in cooperation with $speaker_1$ 160 and $speaker_n$ 162 and $microphone_1$ 164 and $microphone_n$ 166 respectively to allow analog communication thereto. The DSP 150 uses a clock signal supplied by an oscillator (not shown) to time and synchronize the transmitted signals with the received signals by way of the relay control $158_1$ to $158_n$. Glue logic and other supporting electronic devices are added to the devices in FIG. 8 to achieve a fully functional implementation, however, for clarity these devices are not shown here.

The second approach utilizes one data pump ran on the host computer 146 and a second data pump in DSP 150. While a third approach utilizes a complete soft modem approach, where the entire modem 120 is implemented on the host computer 146. In the third approach the data pumps work at the same speed as the general-purpose processor of the host computer.

According to another aspect of the present invention, the principals of the present invention may be incorporated within an ISDN/Digital Telephony Relay 182 as shown in FIG. 10. As such, ISDN/Digital Telephony Relay 182 provides an efficient connection from an ISDN subscriber 178 to an analog subscriber or user 180, such that the connection is transparent to both parties and both parties transceive data as if both parties enjoy a digital connection to telephone network 16.

The ISDN subscriber 178 has a digital connection to a relay server 182. In turn, the relay server 182 by using encoder 12, as shown on FIG. 2, communicates over more than one telephone line with an analog subscriber 180. With appropriate flow-control methods, which are well known in the art, it would appear to ISDN subscriber 178 and analog user 180 that the other party has a similar connection to telephone network 16. The present invention allows both parties to effectively exchange digital information such as video, voice, data, audio, etc.

According to another aspect of the present invention, as shown in FIG. 11, the principals of the present invention may be used for transmission of facsimiles. A transmitting facsimile device 188 scans an image and translates it into a transmitted data stream 190. The data stream 190 is transmitted via the distribution system 192 utilizing the principals of the present invention, i.e. encoder 12 and decoders to receiving facsimile device 194. The encoder and decoder allow greater rates of transceiving facsimiles by aggregating the maximum rate of each line connected to the transmitting facsimile device 188. Furthermore each of the data streams 190 may be used for protocol negotiations between transmitting facsimiles devices 188 and receiving facsimiles devices 194 as described in ITU-T recommendation V.17, "A two-wire modem for facsimile transmission with rates up to 14,400 b/s", Geneva, Switzerland (1991), which is incorporated here as a reference. In this way, facsimiles from the transmitting facsimile device 188 can be advantageously transmitted to receiving facsimile devices at rates higher than possible using conventional transmitting techniques.

Figure 12A:
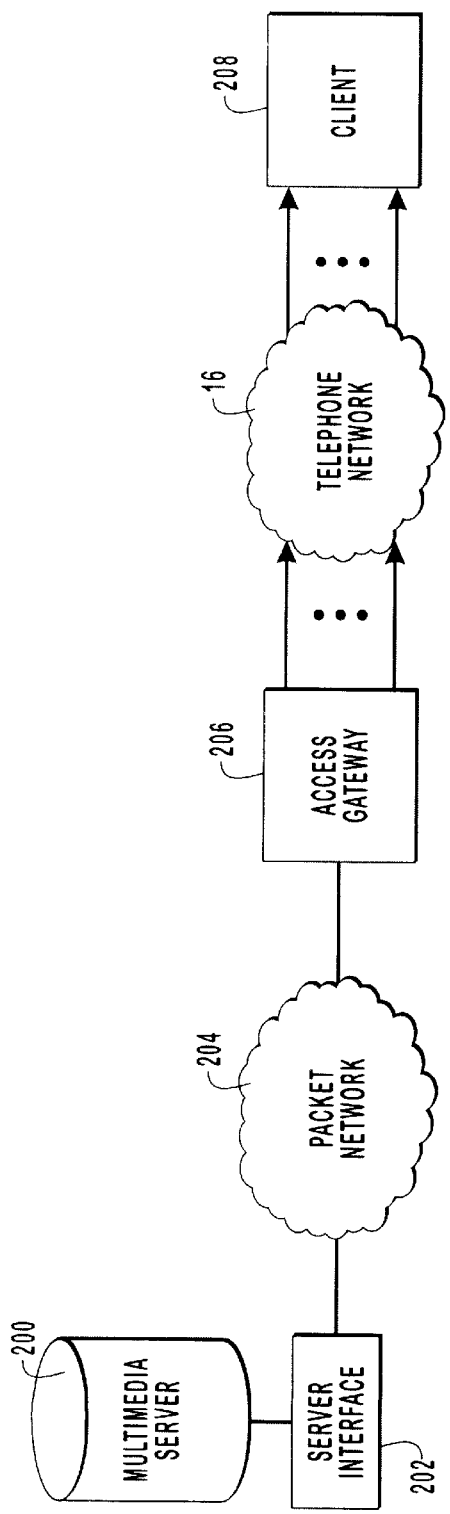
FIG. 12 is a block diagram representing a multimedia distribution server in accordance with the present invention.
Figure 12B:
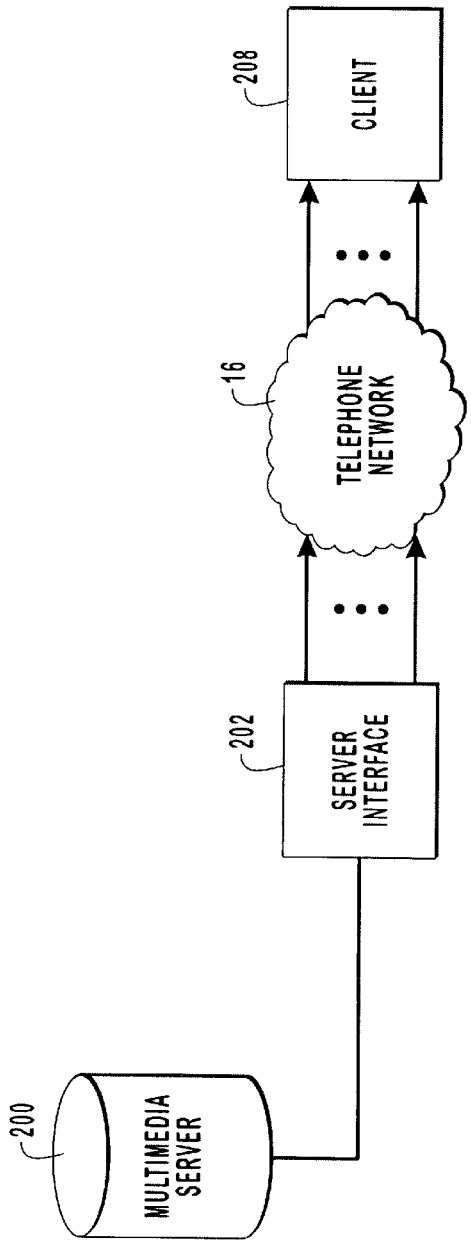

According to another aspect of the present invention, the principals of the present invention may be utilized with a multimedia server 200 that provides data communications of various types of audio, video, etc. between the multimedia server 200 and one or more clients 208, as shown in FIG. 12A. Typically, server 200 will be connected to a packet-switched network 204, such as the Internet, by way of a server interface 202. The multimedia data is transmitted via packet-switched network 204 to a plurality of access gateway devices 206. The access gateway devices 206 are connected to a plurality of clients 208 by way of a telephone network 16. In this embodiment, encoder 12 is incorporated in access gateway 206 and allows increased transmission of all types of data from server 200, including but not limited to narrow-band voice, wide-band audio, video, etc. The quality of the multimedia data transmission is enhanced by the optimum utilization of the bandwidth of all the communication lines, though maximizing the sum of the rates on each line. In an alternate configuration, when the server 200 directly connects to the telephone network 16 without access gateway 206, as shown in FIG. 12B, encoder 12 may be incorporated in server interface 202.

Figure 13:
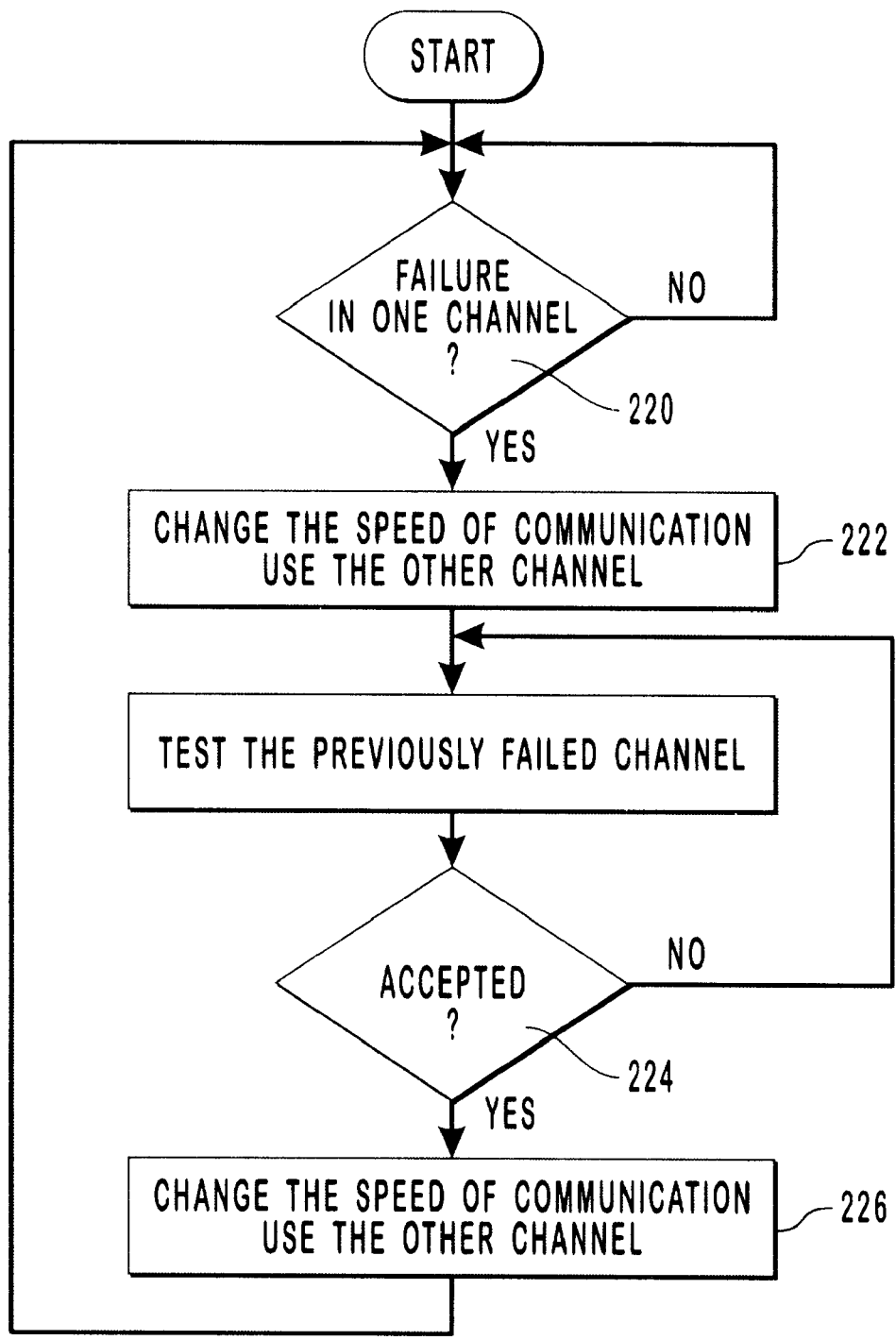
FIG. 13 is a flow diagram representing the operation of a communication protocol utilizing the principals of the present invention.

According to another aspect of the present invention, a shown in FIG. 20, the principals of the present invention may be utilized within a communication protocol to identify the occurrence of failure of a telecommunication channel or line. As depicted in the flow diagram of FIG. 13, the modem determines whether there is a failure in any of the channels, as depicted by decision block 220. If the answer is "No" then the modem continues to check the channels until there is a failure. In the event of a failure the modem changes the rate or speed of communication to use any of the other available channels, as shown by step 222. The modem tests the failed channel to determine whether it is working or not, as shown in decision block 224. In the event that the channel has no longer failed, the modem reverts the data transceival rate to accommodate using all available channels, as shown by step 226. Otherwise, the modem continues to test the failed channel until the failed channel is ready to be used. The process of switching when both or all channels have failed is considered well-known and will not be described in detail in the present application.

According to yet another embodiment of the present invention, the principals of the present invention may be utilized to encrypt signals transceived along unsecured portions of the telephone network 16.

As is known in the art, encryption of analog signals such as voice signals, for example, may be accomplished via analog or digital techniques. Analog techniques include frequency inversion, or other operations on the amplitude, frequency, or phase of the analog signal. Such operations may be accomplished by analog circuitry, or by digital signal processing means.

Figure 14:
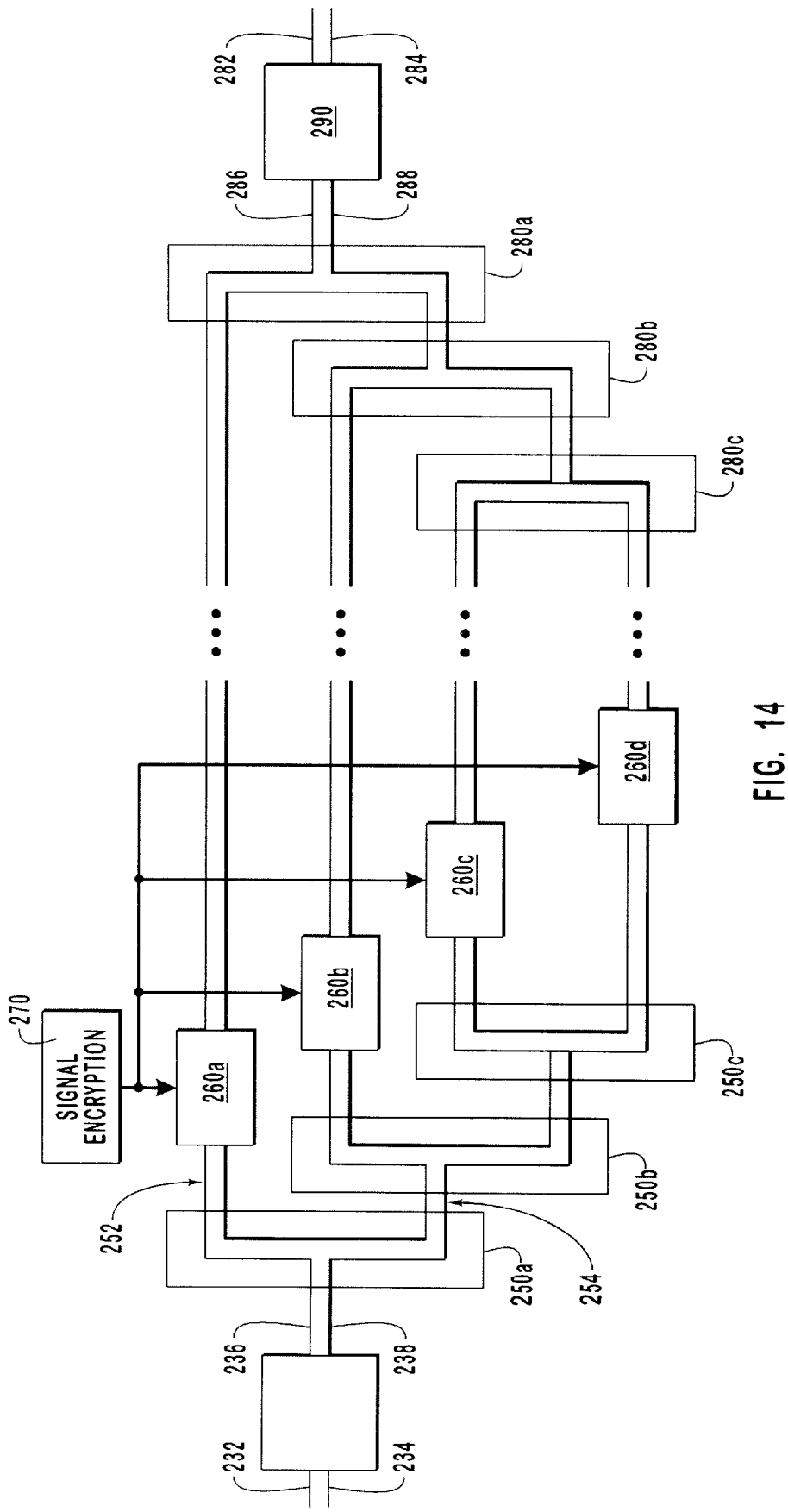
FIG. 14 is block diagram representing a signal encryptor in accordance with the present invention.
Figure 15:
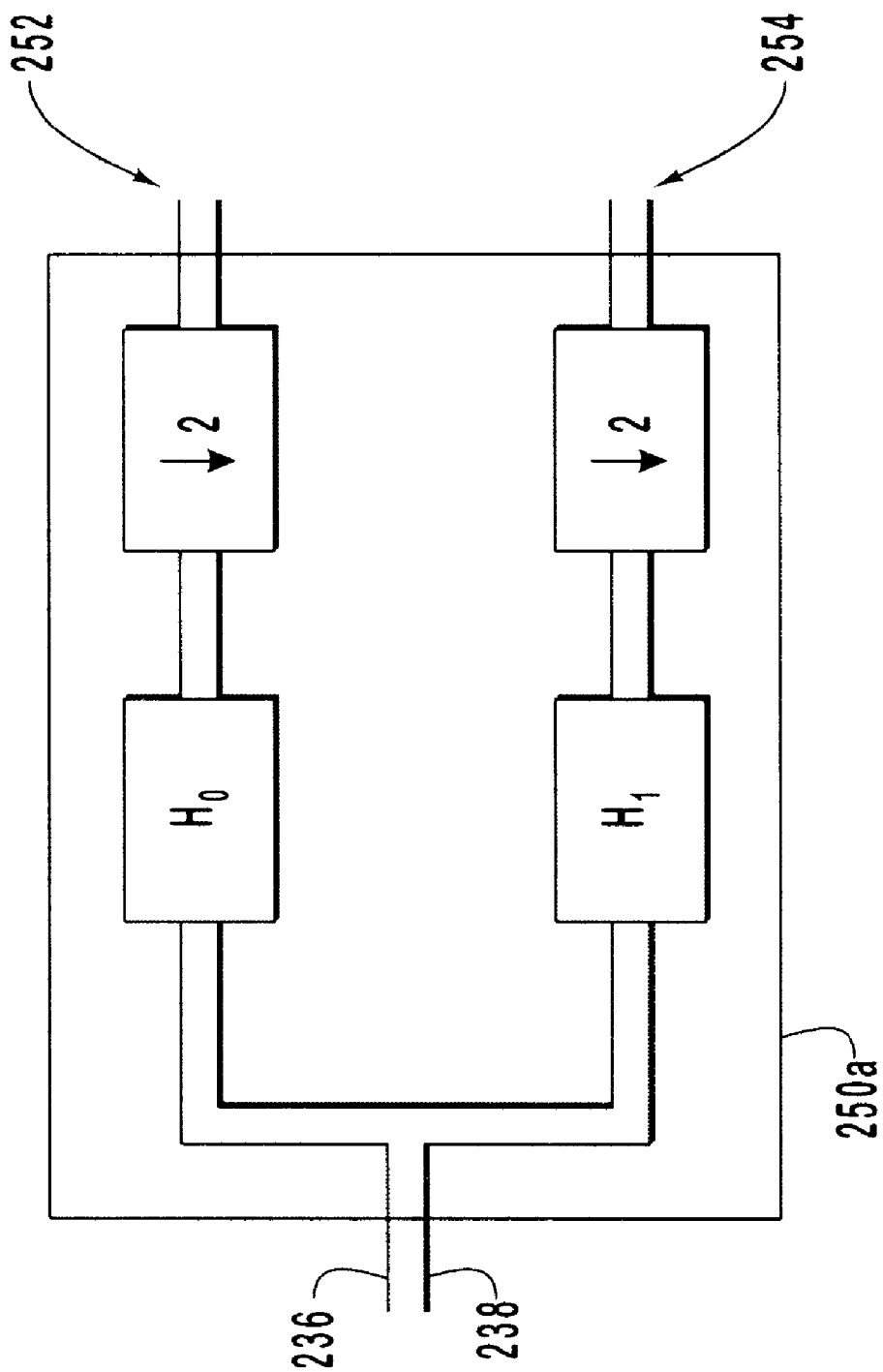
FIG. 15 is a block diagram of a analyzing stage of the signal encryptor of FIG. 14.

In contrast, FIGS. 14–15 describe a signal encryptor according to the present invention. Block 230 creates two output signals 236 and 238 from the input digital signals 232 and 234. Alternatively, block 230 may be omitted if the input signals 232 and 234 can be provided as a sequence of two signals. The two output signals 236 and 238 created by block 230 are sent to a plurality of analyzing stages 250. Each of analyzing stage 250a, 250b, 250c operates in the manner described previously with respect to encoder 12 but has a decomposing form as shown in FIG. 15. As previously discussed, the decomposing function of encoder 12 may be performed by a multifilter bank, therefore analyzing stages 250a, 250b, and 250c may be multifilter banks. With regards to encryption techniques the theory and use of multifilter banks is provided in T. Cooklev et. et al., "*Two-channel multifilter banks and multiwavelet bases,*" IEEE ICASSP, Atlanta, Ga., 1996.

The input signals 236 and 238 to analyzing stages 250a, 250b, and 250c may have various forms such as, but not limited to, voice, video, or some other signal. A number of the decomposed signals output from analyzing stages 250a, 250b, and 250c may vary as previously described with respect to the operation of communication system 10. As shown, for example, analyzing stages 250a, 250b, and 250c output two pairs of signals 252 and 254 each. The signals output from each analyzing stage 250a, 250b, and 250c have different energy levels resulting from the transformation process performed by the multifilter banks forming the analyzing stages 250a, 250b, and 250c. Therefore, approximately 90% of the input signal energy is contained within a single pair of output signals, for example output signals 256 from analyzing stage 250c. The remaining output signals have significantly lower signal energy levels.

Fundamentally, this arrangement of components provides enhanced properties than the arrangement in U.S. Pat. No. 5,682,404, entitled "Method and apparatus for signal transmission and reception", issued to Miller, because the energy compaction properties of the multifilter banks and multiwavelets are higher than those of scalar filter banks. See, for example the book "Wavelets and Filter Banks," by G. Strang and T. Nguyent, published by Wellesly Press, Wellesly, Mass., 1995.

Blocks 260a, 260b, 260c, and 260d detects the energy of the decomposed components output from analyzing stages 250a, 250b, and 250c, while encryption block 270 applies the necessary encryption when block 260 identifies the decomposed output signals with the lowest levels of subband energy. The decomposed output signal with the lowest subband energy are modified by encryption block 270 to cause encryption of the signal. In the most basic terms this may be accomplished by adding a random number to each signal. Various other methods of encrypting the signal output from analyzing stages 250a, 250b, and 250c are known by one skilled in the art. For example, encryption block 270 may be modified to include a digital cipher feedback.

The signals generated by analyzing stages 250a, 250b, and 250c and encrypted by encryption blocks 270 are output to a plurality of synthesizers 280a, 280b, and 280c equal to the number of analyzing stages 250a, 250b, and 250c along with the unmodified subband signals having the maximum amount of energy. The synthesizers 280a, 280b, and 280c reconstruct the input signals 232 and 234 in a similar manner as described with regards to decoder 14. The encrypted signals 286 and 288 from synthesizers 280a, 280b, and 280c are encrypted and output to block 290. Block 290 prepares encrypted signals 286 and 288 to be transceived along the telephone network (not shown) as signals 282 and 284 having a similar form as input signals 232 and 234 with encryption added. Block 290 may be omitted, if processing is performed as two inherently independent signals.

A receiver (not shown) receives the encrypted signal and analyzes the signal to recover the unmodified subband signal. This is accomplished by decrypting the subband signals and resynthesizes the signal to produce the original signal. In other configurations, the receiver may include means for time synchronization and line equalization, which are well known in the prior art and are not discussed here (See J. Bingham, *Theory and practice of modem design*, John Wiley, 1988.)

The present invention may be embodied in other specific forms without departing from the spirit or essential characteristics. The described embodiments are to be considered in all respect only illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A communication apparatus for increasing the rate at which a signal is transceived along a plurality of communication channels within a communication network, comprising:

(1) a line side interface configured for transceiving a first signal;

(2) decomposing means for manipulating said first signal into a plurality of manipulated signals, the number of said plurality of manipulated signals being determined by the plurality of communication channels connected to said decomposing means and the maximum transceival rate of each communication channel, wherein said decomposing means is capable of calculating a plurality of coefficient values related to the number and maximum transceival rate of the communication channels; and (3) reconstructing means for reconstructing said plurality of manipulated signals to form a second signal, said second signal having substantially the same form as said first signal.

2. The communication apparatus as recited in claim 1, wherein said line side interface is in communication with a host capable of transceiving said first signal.

3. The communication apparatus as recited in claim 1, wherein said decomposing means and said reconstructing means are located within a modem.

4. The communication apparatus as recited in claim 1, wherein said communication system is further provided with and encryptor configured for encrypting said first signal.

5. The communication apparatus as recited in claim 1, wherein said decomposing means comprises an interface buffer in communication with a decomposing signal processor.

6. The communication apparatus as recited in claim 1, wherein said decomposing means comprises a DC eliminator and an ISDN convertor.

7. The communication apparatus as recited in claim 1, wherein said decomposing means is further capable of splitting said first signal into said plurality of manipulated signals wherein each manipulated signal has a transceival rate corresponding the maximum transceival rate of said channels.

8. The communication apparatus as recited in claim 1, wherein said reconstructing means comprises a reconstructing circuitry and a buffer.

9. The communication apparatus as recited in claim 1, wherein said reconstructing means performs the substantially inverse signal processing function of said decomposing block.

10. A communication system configured to transceive a signal along multiple communication media of the communication system thereby increasing the rate at which the signal is transceived, the communication system comprising:

(1) a source configured to transceive a signal;

(2) a communication apparatus configured for decomposing said signal into a plurality of manipulated signals, the number of said plurality of manipulated signals being determined by the number of the multiple communication media in communication with said source and the maximum transceival rate of each communication media, wherein the communication apparatus is further configured to calculate a plurality of coefficient values based upon the number and maximum transceival rate of the communication media; and (3) a reconstructing apparatus configured for reconstructing said plurality of manipulated signals, received via the multiple communication media, into said signal, said signal being capable of being transceived by a host.

11. The communication system as recited in claim 10, wherein said source comprises a host.

12. The communication system as recited in claim 11, wherein said host is a server.

13. The communication system as recited in claim 10, wherein said decomposing apparatus and said reconstructing apparatus are located within a server.

14. The communication system as recited in claim 10, wherein said communication system is further provided with and encryptor configured for encrypting said first signal.

15. The communication system as recited in claim 14, wherein said encryptor adds an encrypted portion to said plurality of manipulated signals.

16. The communication system as recited in claim 15, wherein said encrypted portion is added to the manipulated signal having the lowest subband energy level.

17. The communication apparatus as recited in claim 10, wherein said decomposing apparatus comprises electrical circuitry formed to manipulate said signal.

18. The communication apparatus as recited in claim 17, wherein said decomposing apparatus comprises an interface buffer in communication with a decomposing signal processor, said interface buffer being configured to cooperate with said source.

19. The communication apparatus as recited in claim 18, wherein the flow rated of signals through said interface buffer and said decomposing signal processor is controlled by a rate control circuit.

20. The communication apparatus as recited in claim 18, wherein said decomposing apparatus comprises a DC emulator and an ISDN convertor to prepare said signal for transceival within the communication system.

21. The communication system as recited in claim 10, wherein said reconstructing apparatus comprises electrical circuitry to reconstruct said first signal from said plurality of manipulated signals.

22. The communication system as recited in claim 21, wherein said reconstructing apparatus comprises a reconstructing circuit and a buffer.

23. The communication system as recited in claim 21, wherein said plurality of manipulated signals contain an encryption portion.

24. The communication system as recited in claim 21, wherein said reconstructing apparatus performs the substantially inverse signal processing function of said decomposing block.

25. The communication system as recited in claim 10, wherein the communication system transceives facsimile signals.

26. The communication system as recited in claim 10, wherein the communication system transceives video signals.

27. The communication system as recited in claim 10, wherein the communication system transceives audio signals.

28. A method of transceiving a signal along multiple communication media lines from a source to a host, said method comprising the steps of:

(1) interfacing with a first signal transceived along a first communication media from the source;

(2) identifying the number of second communication media lines along which said first signal is capable of being transcieved;

(3) calculating a plurality of manipulation coefficients based upon the number of identified communication media lines and said maximum communication rate of each said identified communication media line;

(4) decomposing said first signal at a controllable rate into multiple components of said first signal capable of being transceived along the plurality of identified communication media lines, the number of said multiple components being based on the number of identified communication media lines in communication with said source and the maximum communication rate of each identified communication media line; and (5) reconstructing said multiple components transceived along said plurality of identified communication media lines to form a second signal having substantially the same form as said first signal.

29. The method as recited in claim 28, further including the step of encrypting said manipulated components to form a plurality of encrypted components.

30. The method as recited in claim 29, wherein the reconstructing step further comprises reconstructing said plurality of encrypted components to form said second signal.

31. The method as recited in claim 28, wherein the decomposing step further comprises transceiving said manipulation coefficients from a decomposing apparatus to a reconstructing apparatus.

32. The method as recited in claim 31, wherein said decomposing apparatus comprises:

(a) an interface buffer configured to cooperate with the host;

(b) a decomposing signal processor configured to split said first signal into said multiple components of said first signal; and (c) a rate control circuit formed to control said interface buffer and said decomposing signal processor such that said multiple components of said first signal are transceived along said communication media lines at said maximum communication rate of each said communication media line.

33. The method as recited in claim 32, wherein said reconstructing apparatus comprises:

(a) a buffer configured to cooperate with a target host; and (b) a reconstructing circuit configured to perform the inverse function procedure performed by said decomposing apparatus.

34. A method of transceiving a signal along multiple communication channels from a source to a remotely located host, said method comprising the steps of:

(1) receiving at least one input data stream from a source;

(2) identifying a plurality of available individual communication channels, wherein each of the available communication channels has a maximum communication rate;

(3) calculating at least one coefficient value the at least one coefficient value being based upon the number of identified individual communication channels and the maximum communication rate of each identified individual communication channel;

(4) transforming the at least one input data stream into a predetermined number of separate output signals, wherein the predetermined number is determined based upon the at least one coefficient value; and (5) transceiving each of the separate output signals to the remotely located host via a corresponding available communication channel.

35. The method as recited in claim 34, further comprising the step of reconstructing, at the host, the separately transceived output signals to form at least one second signal having substantially the same form as the at least one input data stream.

36. The method as recited in claim 34, wherein the transceiving rate of each of the separate output signals is equal to a maximum communication rate of the communication channel on which it is being transceived.

37. The method as recited in claim 36, wherein the maximum communication rate of each of the communication channels varies over time.

38. A method for communicating a data stream between a source and a remotely located host, the method comprising the steps of:

receiving an incoming data stream at the source;

identifying a plurality of communication channels available for communication between the source and the remotely located host;

calculating a plurality of coefficient values, the coefficient values relating to the number and maximum communication rate of the identified communication channels;

transforming the incoming data stream into a plurality of data streams, wherein the transformation is performed based upon the coefficient values;

communicating each of the plurality of data streams to the host via a separate communication channel; and reconstructing the plurality of data streams at the host into a single data stream having substantially the same form as the incoming data stream.

39. A method for communicating at least one input data stream between a source and a remotely located host, the method comprising the steps of:

identifying at least two communication channels available to the source for communicating with the remotely located host;

calculating a plurality of coefficient values, the coefficient values being based upon the number of communication channels identified and the maximum communication rate of each of the communication channels;

decomposing the at least one input data stream into a plurality of data streams, wherein the decomposition is performed based upon the values of the coefficient values;

communicating each of the plurality of decomposed data streams via a separate communication channel; and reconstructing the plurality of decomposed data streams at the host into a single reconstructed data stream, wherein the reconstruction is performed based upon the values of the coefficient values so that the reconstructed data stream has substantially the same form as the at least one input data stream.

* * * * *

UNITED STATES PATENT AND TRADEMARK OFFICE
CERTIFICATE OF CORRECTION

PATENT NO. : 6,490,295 B1
DATED : December 3, 2002
INVENTOR(S) : Todor Cooklev et al.

It is certified that error appears in the above-identified patent and that said Letters Patent is hereby corrected as shown below:

Column 10,
Line 20, change "80, to 8 on" to -- $80_1$ to $80_n$ --

Column 15,
Line 20, before "encryptor" change "and" to -- an --
Line 32, change "corresponding" to -- corresponding to --

Column 16,
Line 3, before "encryptor" change "and" to -- an --

Signed and Sealed this

Fifteenth Day of July, 2003

JAMES E. ROGAN
*Director of the United States Patent and Trademark Office*